United States Patent
Alduaiji

(10) Patent No.: US 9,202,029 B2
(45) Date of Patent: Dec. 1, 2015

(54) COMPUTER DEVICE, A METHOD FOR CONTROLLING A LOGIN STATUS OF A COMPUTER DEVICE AND A SERVER

(71) Applicant: Maan Alduaiji, Ames, IA (US)

(72) Inventor: Maan Alduaiji, Ames, IA (US)

(*) Notice: Subject to any disclaimer, the term of this patent is extended or adjusted under 35 U.S.C. 154(b) by 91 days.

(21) Appl. No.: 14/011,004

(22) Filed: Aug. 27, 2013

(65) Prior Publication Data

US 2015/0067803 A1  Mar. 5, 2015

(51) Int. Cl.
  *G06F 21/31*  (2013.01)
  *G06F 21/41*  (2013.01)

(52) U.S. Cl.
  CPC .............. *G06F 21/31* (2013.01); *G06F 21/41* (2013.01); *G06F 2221/2101* (2013.01); *G06F 2221/2117* (2013.01)

(58) Field of Classification Search
  None
  See application file for complete search history.

(56) References Cited

U.S. PATENT DOCUMENTS

| | | | |
|---|---|---|---|
| 8,396,452 B1 | 3/2013 | Matsuoka | |
| 2004/0181695 A1* | 9/2004 | Walker | 713/202 |
| 2010/0024017 A1* | 1/2010 | Ashfield et al. | 726/7 |
| 2010/0046553 A1* | 2/2010 | Daigle et al. | 370/474 |
| 2010/0318294 A1* | 12/2010 | Rosing et al. | 701/220 |
| 2013/0324081 A1* | 12/2013 | Gargi et al. | 455/411 |
| 2015/0011175 A1* | 1/2015 | Mondal et al. | 455/404.2 |

FOREIGN PATENT DOCUMENTS

| | | |
|---|---|---|
| CN | 102314352 A | 1/2012 |
| EP | 1133119 B1 | 12/2006 |
| TW | 201201027 A | 1/2012 |

* cited by examiner

*Primary Examiner* — Michael R Vaughn
*Assistant Examiner* — Richard McCoy
(74) *Attorney, Agent, or Firm* — Oblon, McClelland, Maier & Neustadt, L.L.P.

(57) ABSTRACT

A computer device that can login to a personal account located on a server via the internet, the computer device includes communication circuitry that is configured to access the internet, a user interface to receive a request to login to the personal account, a memory that stores information, and processing circuitry that controls the communication circuitry to transmit to the server a request to login to the personal account, analyzes a type of the personal account, calculates a distance between the computer device and another computer device, controls the communication circuitry to transmit a notification to the another computer device in response to the processing circuitry determining that the type of personal account is a specific personal account and the distance being greater than a first predetermined distance, and transmits a request to the server to logoff the personal account when a permission is received.

11 Claims, 12 Drawing Sheets

COMPUTER DEVICE, A METHOD FOR CONTROLLING A LOGIN STATUS OF A COMPUTER DEVICE AND A SERVER

GRANT OF NON-EXCLUSIVE RIGHT

This application was prepared with financial support from the Saudia Arabian Cultural Mission, and in consideration therefore the present inventor(s) has granted The Kingdom of Saudi Arabia a non-exclusive right to practice the present invention.

BACKGROUND

Field of the Disclosure

With the widespread use of networks, such as the Internet, in recent years, it has become increasingly common to log into various personal accounts (e.g., social media account, bank account) in external systems to access information. In order to log into the personal accounts securely, it is common that the external systems requires personal login information, such as ID and/or password. The present disclosure relates to a computer device that can login to a personal account, and more particularly, relates to a computer device that can login to a personal account located on a server via the internet and control a login status of the computer device.

SUMMARY

The foregoing paragraphs have been provided by way of general introduction, and are not intended to limit the scope of the following claims. The described embodiments, together with further advantages, will be best understood by reference to the following detailed description taken in conjunction with the accompanying drawings.

Among other things, the present disclosure provides a computer device that can login to a personal account located on a server via the internet, the computer device includes communication circuitry that is configured to access the internet, a user interface to receive a request to login to the personal account, a memory that stores information received by the communication circuitry and the user interface, and processing circuitry that controls the communication circuitry to transmit to the server a request to login to the personal account, analyzes a type of the personal account, calculates a distance between the computer device and another computer device designated by information received from the server, controls the communication circuitry to transmit a notification to the another computer device in response to the processing circuitry determining that the type of personal account is a specific personal account and the distance being greater than a first predetermined distance, and controls the communication circuitry to transmit a request to the server to logoff the personal account when a permission signal to logoff the personal account is received from the another computer device by the communication circuitry in response to the notification.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION OF THE EMBODIMENTS

Figure 1:
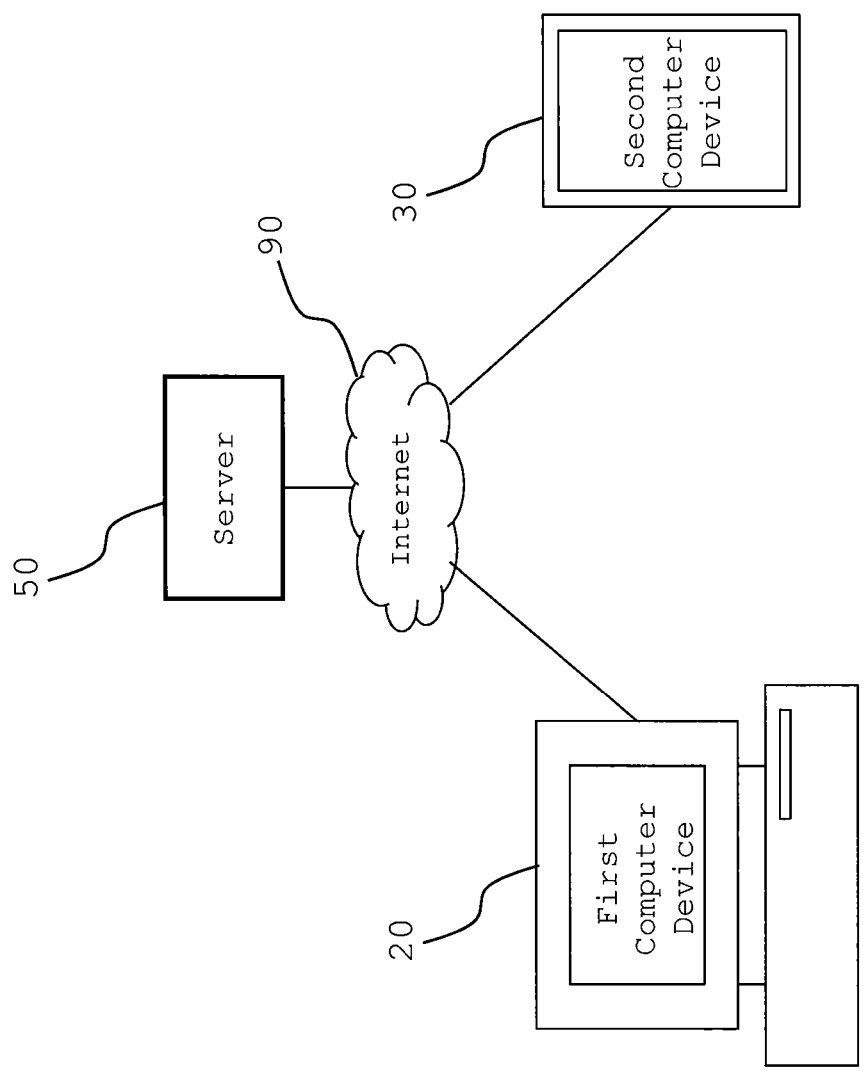
FIG. 1 is an exemplary system for controlling a login status of a computer device to a personal account located on a server according to one embodiment.

Referring now to the drawings, wherein like reference numerals designate identical or corresponding parts throughout the several views, FIG. 1 is an exemplary system for controlling a login status of a computer device to a personal account located on a server according to one embodiment. First computer device 20 is a computer device (e.g., personal computer or mobile device) that can login to a personal account (e.g. bank account, email, social networking account) located on a server 50 via the internet 90. For example, the first computer device 20 logs in to a bank account by inputting a correct ID and password to an user interface and transmit them to the server 50 via the internet 90. Second computer device 30 is an another computer device (e.g., smartphone, tablet computer) that can also login to a personal account located on the server 50 via the internet 90. Server 50 is one or more servers (e.g., web server, application server, database server) that respond to requests across a computer network and manages the personal accounts of users. For example, the server 50 receives a login request with ID and password from the first computer device and verifies the ID and the password. Then, if the ID and the password are correct, the server 50 admits the first computer device 20 to login to the personal account. Then, if the server 50 receives request from the first computer device 20 to logoff the personal account, the server 50 controls the first computer device 20 to logoff the personal account and the information from the server 50 to the first computer device 20 is updated from login status to logoff status. Internet 90 is any network that allows computers and servers to communicate information with each other over computer networks.

Figure 2:
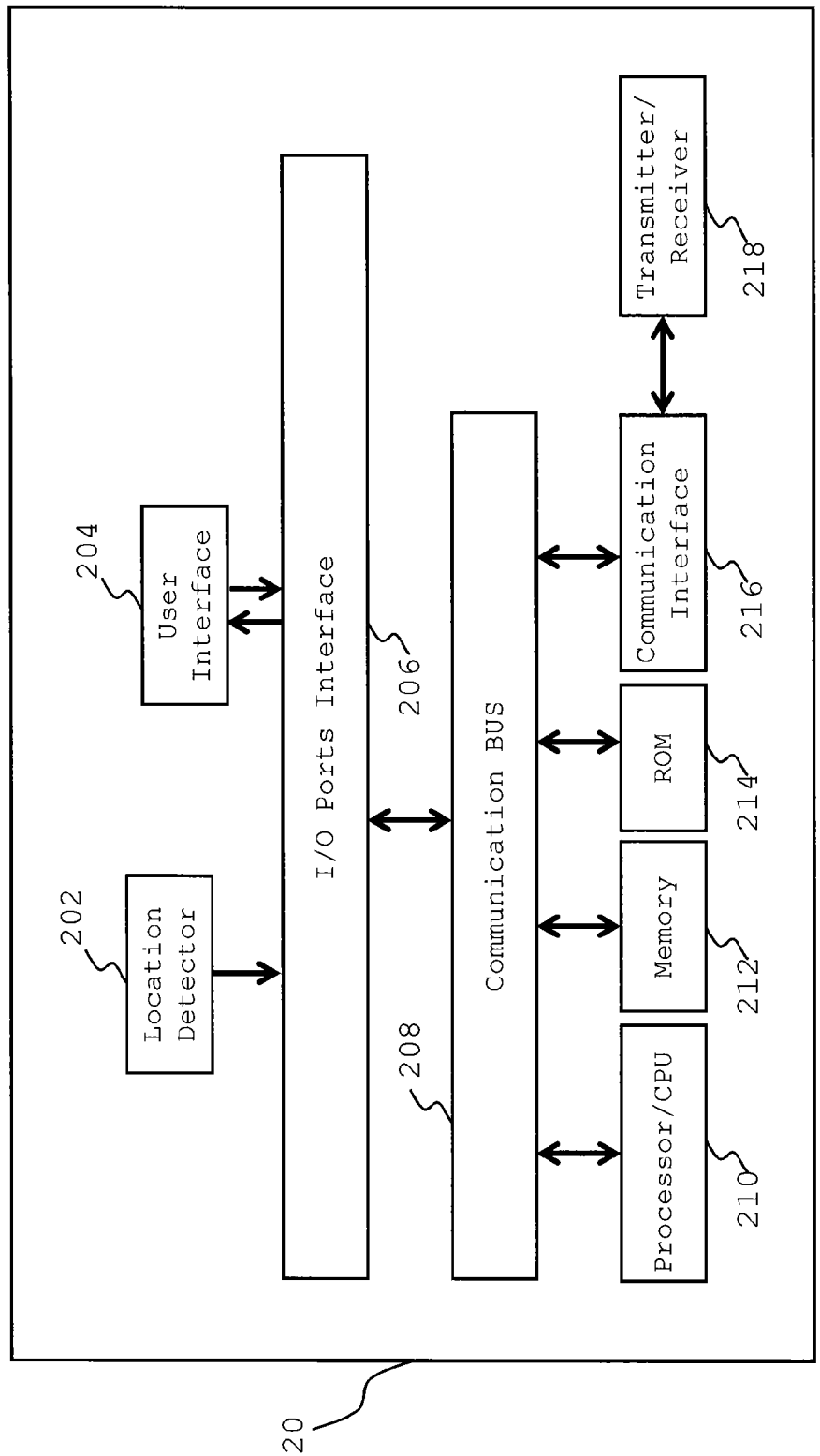
FIG. 2 is an exemplary block diagram of a first computer device according to one embodiment.

FIG. 2 is an exemplary block diagram of the first computer device 20 according to one embodiment. The first computer device 20 may include a location detector 202 that detects a location of the first computer device 20. The location detector 202 may be a GPS (Global Positioning System) module to detect a current geographical location of the first computer device 20 or it may detect a location of the first computer device 20 as a network address on the internet 90. If the first computer device 20 is used at only one place and not for mobile use, the user may preregister the address where it is located to the first computer device 20. The first computer device 20 may include a user interface 204 (e.g., keyboard, touch panel, microphone, display, speaker) through which a user can input information to the first computer device 20 or information received from the server 50 or the second computer device 30 may be output. For example, a user may input ID and password to login to a personal account through a keyboard, a touch panel or a microphone.

The location detector 202 and the user interface 204 are connected to I/O ports interface 206 and exchange data with the interface. The I/O ports interface 206 may include logic to interpret the device address generated by the processor/CPU 210. The I/O ports interface 206 may also include a handshaking logic so that the processor/CPU 210 can communicate with the location detector 202 and user interface 204 through the interface. The I/O ports interface 206 is also connected to communication BUS 208. Communication BUS 208 is also connected to processor/CPU 210, memory 212, ROM 214 and communication interface 216. Communication BUS 208 stores information and instructions to be executed by the processor/CPU 210 and manages the signal transaction between each component in the first computer device 20. The communication BUS 208 may include a data bus to carry information, an address bus to determine where the information should be sent and a control bus to determine its operation.

Processor/CPU 210 executes one or more sequences of one or more instructions contained in a memory, such as memory 212. Such instructions may be read into the memory 212 from another computer readable medium, such as a hard disk or removable media drive. One or more processors in a multiprocessing arrangement may also be employed to execute the sequences of instructions contained in memory 212. In alternative embodiments, hard-wired circuitry may be used in place of or in combination with software instructions. Thus, embodiments are not limited to any specific combination of hardware circuitry and software.

As stated above, the first computer device 20 includes at least one computer readable medium or memory, such as memory 212, for holding instructions programmed according to the teachings of the present disclosure and for containing data structures, tables, records, or other data described herein. Examples of non-transitory storage device are compact discs, hard disks, floppy disks, tape, magneto-optical disks, PROMs (EPROM, EEPROM, flash EPROM), DRAM, SRAM, SDRAM, or any other magnetic medium, compact discs (e.g., CD-ROM), or any other optical medium, punch cards, paper tape, or other physical medium with patterns of holes, a carrier wave, or any other medium from which a computer can read.

Stored on any one or on a combination of computer readable medium, the present disclosure includes software for controlling the first computer device 20. Such software may include, but is not limited to, device drivers, operating systems, development tools, and applications software. Such computer readable medium further includes the computer program product of the present disclosure for performing all or a portion (if processing is distributed) of the processing performed in implementing the disclosure.

The computer code devices of the present disclosure may be any interpretable or executable code mechanism, including but not limited to scripts, interpretable programs, dynamic link libraries (DLLs), Java classes, and complete executable programs. Moreover, parts of the processing of the present disclosure may be distributed for better performance, reliability, and/or cost.

The term "computer readable medium" as used herein refers to any non-transitory or transitory medium that participates in providing instructions to the processor/CPU 210 for execution. A computer readable medium may take many forms, including but not limited to, non-volatile media, volatile media, and transmission media. Non-volatile media includes, for example, optical magnetic disks, and magneto-optical disks, such as the hard disk or the removable media drive. Volatile media includes dynamic memory, such as the memory 212. Transmission media includes coaxial cables, copper wire and fiber optics, including the wires that make up the communication bus 208. Transmission media may also take the form of acoustic or light waves, such as those generated during radio wave and infrared data communications.

Various forms of computer readable media may be involved in carrying out one or more sequences of one or more instructions to processor/CPU 210 for execution. For example, the instructions may initially be carried on a magnetic disk of a remote computer. The remote computer can load the instructions for implementing all or a portion of the present disclosure remotely into a dynamic memory and send the instructions over a telephone line using a modem. A modem local to the first computer device 20 may receive the data on the phone line and use an infrared transmitter to convert the data to an infrared signal. An infrared detector coupled to the communication bus 208 can receive the data carried in the infrared signal and place the data on the communication bus 208. The communication bus 208 carries data to the memory 212, from which the processor/CPU 210 retrieves and executes the instructions. The instructions received by the memory 212 may optionally be stored on storage device either before or after execution by processor/CPU 210.

Memory 212 is any non-transitory storage device such as compact discs, hard disks, floppy disks, tape, magneto-optical disks, PROMs (EPROM, EEPROM, flash EPROM), random access memory (RAM), DRAM, SRAM, SDRAM, or any other magnetic medium, compact discs (e.g., CD-ROM), or any other optical medium, punch cards, paper tape, or other physical medium with patterns of holes, a carrier wave, or any other medium from which a computer can read and coupled to the communication bus 208 for storing information and instructions by the processor/CPU 210. In addition, the memory 212 may be used for storing temporary variables or other intermediate information during the execution of instructions by the processor/CPU 210.

The first computer device 20 further includes a read only memory (ROM) 214 or other static storage device (e.g., programmable ROM (PROM), erasable PROM (EPROM), and electrically erasable PRM (EEPROM)) coupled to the communication bus 208 for storing static information and instructions for the processor/CPU 210.

The first computer device 20 may also include a communication interface 216 coupled to the communication BUS 208. The communication interface 216 provides a two-way data communication coupling to a network link that is connected to, for example, wired communication network (e.g., LAN) or wireless communication network (e.g., cellular networks or wireless LAN) connected to the internet 90. In any such implementation, the communication interface 216 sends and/or receives electrical, electromagnetic or optical signals that carry digital data streams representing various types of information. The communication interface 216 may be further connected to a transmitter/receiver 218 including a transmitter and a receiver.

The network link typically provides data communication through one or more networks to other data devices. For example, the network link may provide a connection to the server 50 or the second computer device 30 through the internet 90. The first computer device 20 may transmit and/or receive data, including program code, through the network (s), the network link, the transmitter/receiver 218 and the communication interface 216. The processor/CPU 210 may control the transmitter/receiver 218 to transmit information obtained by the location detector 202 or information input to the user interface 204 to the server 50 or the second computer device 30 through the internet 90. The processor/CPU 210 may control the transmitter/receiver 218 to receive information from the server 50 or the second computer device 30 through the internet 90 and control the user interface 204 to output the received information.

Figure 3:
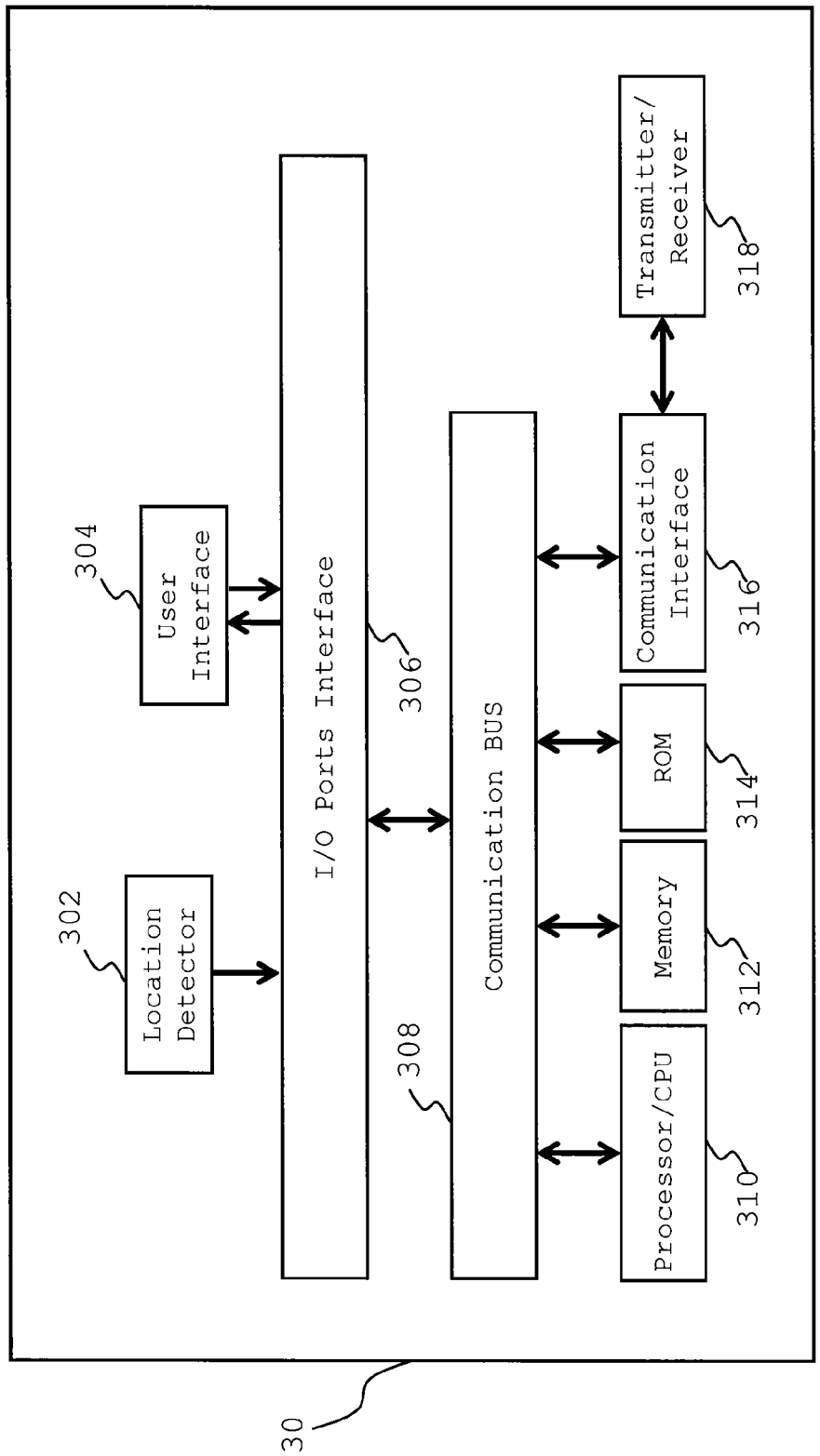
FIG. 3 is an exemplary block diagram of a second computer device according to one embodiment.

FIG. 3 is an exemplary block diagram of the second computer device according to one embodiment. Many of the components perform a similar function to those described in FIG. 2.

Figure 4:
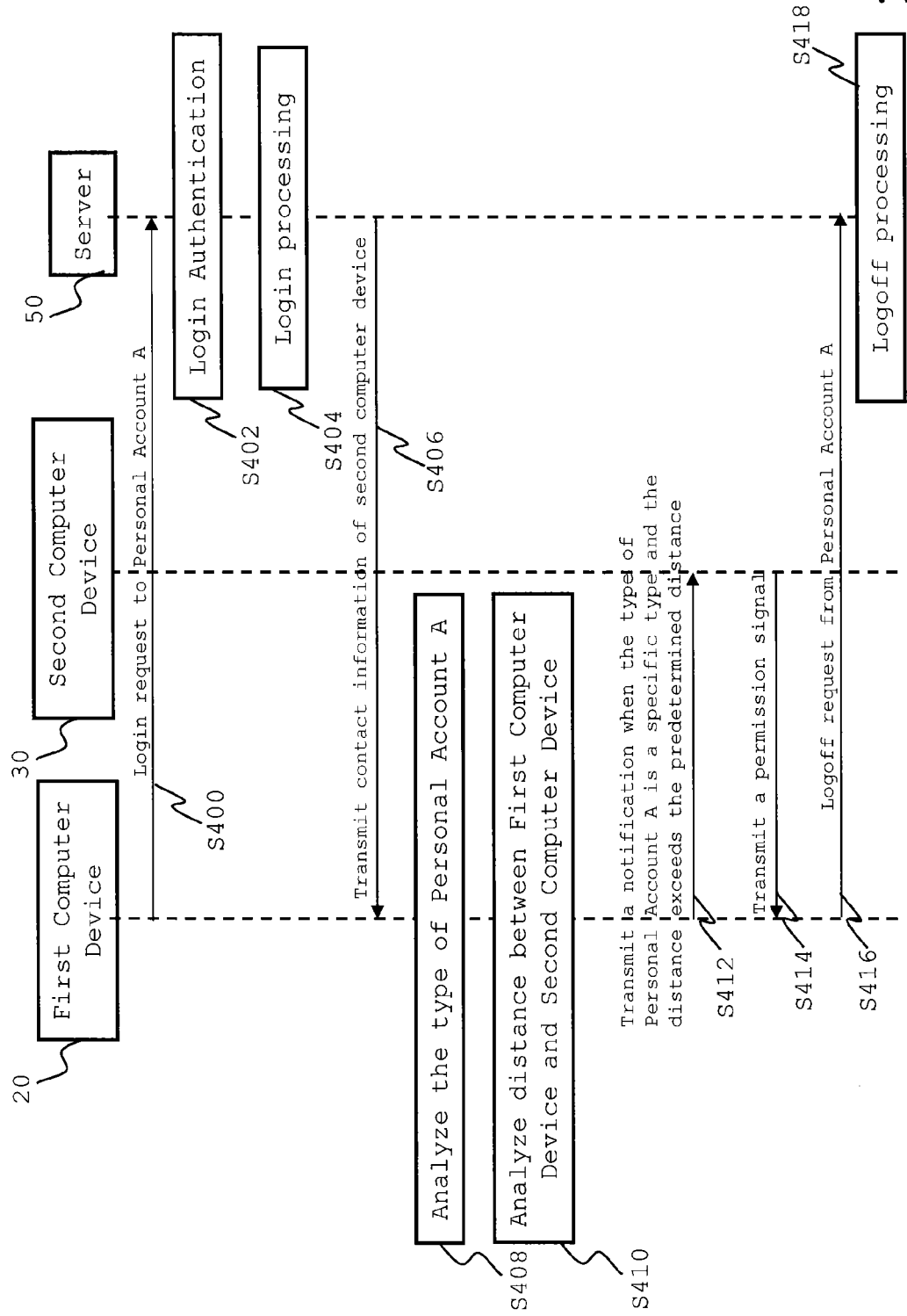
FIG. 4 is an exemplary flowchart of a system for controlling a login status of a computer device to a personal account located on a server according to one embodiment.

FIG. 4 is an exemplary flowchart of a system for controlling a login status of a computer device to a personal account located on a server according to one embodiment. For example, a user may login using a first computer device 20 located in a public space (e.g., public library or hotel lobby) or the user's home. At S400, in response to an input by a user through the user interface 204 (e.g., a user may input a user ID and a password on a bank website), the first computer device 20 transmits login request to a personal account A (e.g., bank account or social media account) to the server 50 through the internet 90. At S402, the server 50 performs login authentication by, for example, checking whether the combination of the user ID and the password is the same as what was preregistered by the user. At S404, if the login request sent from the first computer device 20 is authenticated, the server 50 performs login processing and allows the first computer device 20 to login to the personal account A. Then the user may, for example, make remittance on his bank account or communicate with his friend on his social media account on the first computer device 20. At S406, after the login processing was done, the server 50 transmits contact information of the second computer device 30 to the first computer device 20. A user may preregister the contact information of the second computer device 30 (e.g., the user's smartphone or tablet computer) to the server 50. For example, a user may preregister an email address or a phone number of the second computer device as emergency contact information on the website after logging in to the personal account through the second computer device 30 or other computer device.

At S408, the first computer device 20 analyzes the type of the personal account A and judges whether the personal account A is a type of a personal account to control the login status or not. For example, a user may preregister the personal account to control a login status by inputting whether or not the user wants a login status control on the website of each of personal account. A user may preregister a bank account to control a login status and preregister a social media account not to control a login status for example. Then, the processor/CPU 210 in the first computer device 20 analyzes information transmitted from the server 50 and received by the transmitter/receiver 218, and analyzes the type of the personal account A (i.e., whether the personal account A is an account to control a login status or not).

In another example, based on information received from the server 50 by the transmitter/receiver 218, the processor/CPU 210 in the first computer 20 may analyze words on the website of the personal account A, judge whether the website includes a specific word(s) (e.g., money, dollar or remittance, which will be related with a bank account), and analyze the type of the personal account A (e.g., if the website includes the word "remittance", the processor/CPU 210 may judge the personal account A is an account to control a login status as there is a high possibility that the personal account A is related with some kind of money transaction).

In another example, the processor/CPU 210 may analyze data received from the server 50 by the transmitter/receiver 218 and judge whether the website includes a specific type of data (e.g., a data indicating that the website is protected by an encryption), whether the domain name of the website includes a specific word (e.g., "bank", preregistered famous domain name), whether the website requires authentication to login (e.g., the website requires inputting a password) or requires multiple authentications to request a specific action (e.g., a bank website requires inputting a password to login and another password to remit money), whether the website accepts character input (e.g., users can input and exchange messages on the website), whether the encryption/security level of the website is higher than a first specific level, whether the website is a website where a user is automatically forced to be logged off when there is no input for predetermined amount of time, or whether the website is a company's intranet.

At S410, the processor/CPU 210 in the first computer device 20 analyzes distance between the first computer device and the second computer device 30. Detailed description on S410 is described in FIG. 5.

At S412, the processor/CPU 210 in the first computer device 20 controls the transmitter/receiver 218 to transmit a notification to the second computer device 30 when the type of the personal account A is the specific type of account to control the login status (e.g., bank account, company intranet) and the distance between the first computer device 20 and the second computer device 30 exceeds the predetermined distance. This notification is transmitted to the second computer device based on the contact information of the second computer device received at S406. This notification may include a text message, such as "May the first computer device 20 logoff the personal account A?" inquiring a permission to logoff the personal account A. For example, the second computer device 30 may be a mobile computer device, such as a smartphone or a tablet computer, carried by the user and he can receive a notification remotely when he forgets to logoff the personal account A and leaves the first computer device 20. Then the second computer device 30 outputs the notification through the user interface 304 (e.g., displaying the notification message on the display).

In another example, the processor/CPU 210 may control the transmitter/receiver 218 to transmit the notification to the second computer device 30 only when the location detector 202 detects that the computer device 20 is not located in a predetermined location. A user may preregister a specific location of the first computer device 20 from where he does not need to receive a notification to the website of the personal account. For example, if the user does not need a notification from the computer located in his home, he may preregister the location information of his home (e.g., address, GPS information or internet address) to the website of the personal account A as a location from where he does not need to receive a notification. Then, even though the type of personal account A is the specific type and the distance between the first computer device 20 and the second computer device 30 exceeds the predetermined distance, if the first computer device 20 is located in his home, the first computer device 20 does not transmit the notification to the second computer device 30. As the risk that a stranger will operate the first computer device 20 when the user is away from the first computer device 20 and remit money on the bank account for example, will be quite low as long as the first computer device 20 is located in the user's home or office, in this way, the user can avoid unnecessary notification transmitted from the first computer device by preregistering a location.

In response to the notification, if the user determines that the first computer should logoff the personal account A, for example, he may select "Yes" on the touch panel 304 of the second computer device 30, and then at S414, the processor/CPU 310 controls the transmitter/receiver 318 to transmit a permission signal to logoff the personal account A to the first computer device 20. The second computer device 30 may transmit the permission signal through the server 50 to the first computer device 20, or it may directly transmit the permission signal to the first computer device 20 based on contact information (e.g., email address or network address) of the first computer device received from the server 50.

At S416, when the first computer device 20 receives a permission signal from the second computer device 30, the processor/CPU 210 in the first computer device 20 controls the transmitter/receiver 218 to transmit a logoff request from the personal account A to the server 50. In another example, in response to the notification from the first computer device 20, the second computer device 30 may transmit logoff request from the personal account A directly to the server 50, in response to the input by the user from the second computer device 30 to permit logging off the personal account A.

At S418, when the server 50 receives the logoff request from the personal account A from the first computer device 20, the server 50 performs logoff processing. In this way, the user can reduce the risk that a stranger will operate the first computer device 20 being logged in to the personal account A when the user is away from the first computer device 20, and remit money on the user's bank account for example, by remotely logging off the first computer device 20 from the personal account A.

Figure 5:
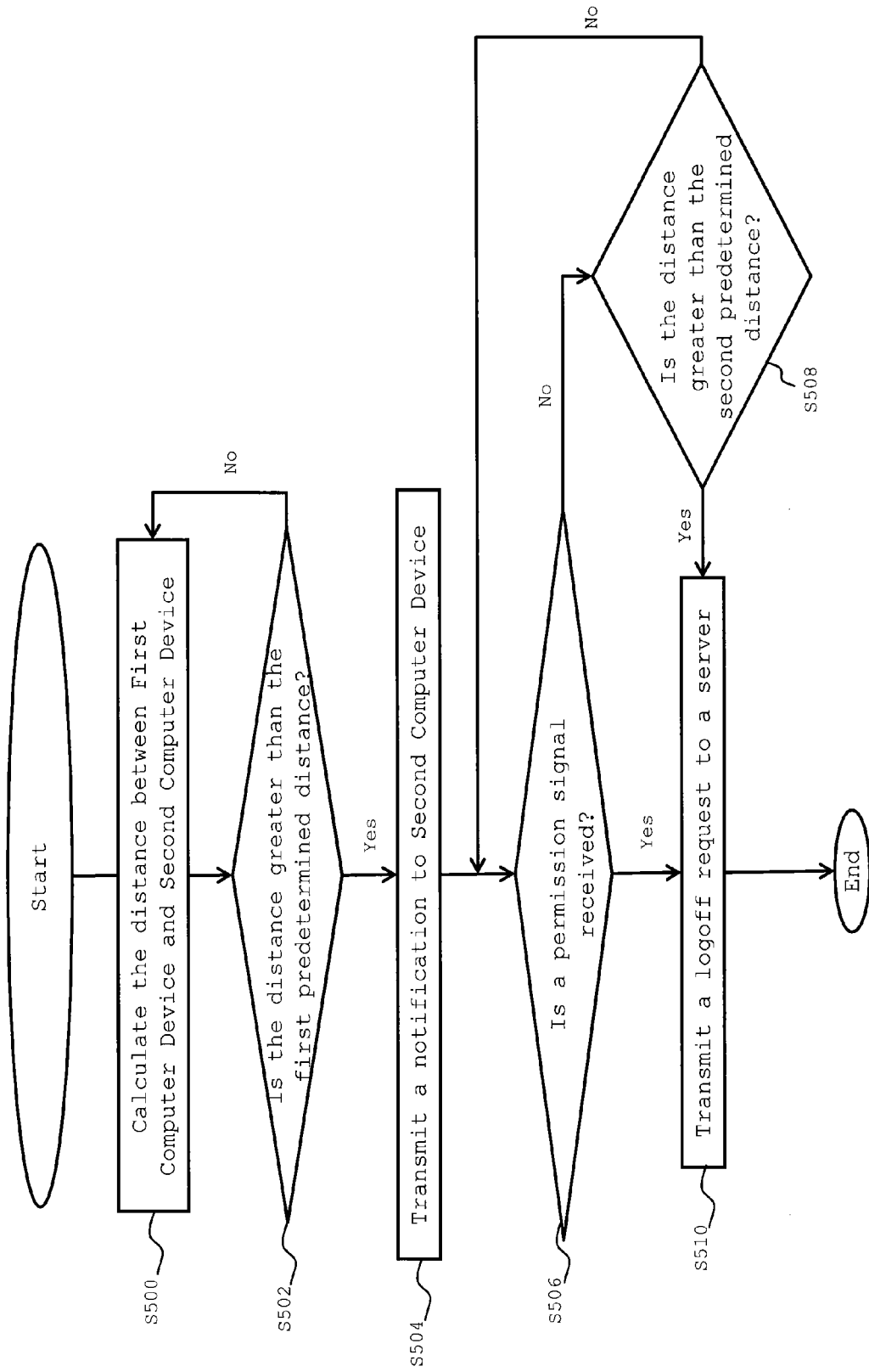
FIG. 5 is an exemplary flowchart of an analysis on distance between a first computer device and a second computer device according to one embodiment.

FIG. 5 is an exemplary flowchart of an analysis on distance between the first computer device 20 and the second computer device 30 according to one embodiment. At S500, the processor/CPU 210 in the first computer device 20 calculates the distance between the first computer device 20 and the second computer device 30. For example, the processor/CPU 210 may calculate the distance by using both the location information of the first computer device 20 detected by the location detector 202 or preregistered to the first computer device 20, and GPS information obtained by the location detector 302 and transmitted from the second computer device 30. The second computer device 30 may transmit the GPS information through the server 50 to the first computer device 20, or it may directly transmit the GPS information to the first computer device 20 based on contact information (e.g., email address or network address) of the first computer device received from the server 50. The second computer device 30 transmits the GPS information every predetermined amount of time (e.g., 10 seconds) to the first computer device 20.

At S502, the processor/CPU 210 determines whether the distance between the first computer device 20 and the second computer device 30 is greater than the first predetermined distance (e.g., 1 mile) or not. The first predetermine distance may be preregistered to the memory 212 of the first computer device 20, or it may be preregistered to the server 50 through the website of the personal account A by the user and received from the server by the transmitter/receiver 218. The user may preregister the first predetermined distance for each of the personal account by preregistering the distance to each of the personal account (e.g., 50 feet for a bank account, 1 mile for a social media account). Then if the processor/CPU 210 determines the distance is not greater than the first predetermined distance, the step proceeds to S500 and the processor/CPU 210 keeps on calculating the distance until the distance becomes greater than the first predetermined distance. If the processor/CPU 210 determines the distance is greater than the first predetermined distance, the step proceeds to S412.

At S504, the processor/CPU 210 controls the transmitter/receiver 218 to transmit a notification to the second computer device 30 when the type of the personal account A is the specific type of account to control the login status analyzed in S408 (e.g., bank account, company intranet) and the distance between the first computer device 20 and the second computer device 30 exceeds the first predetermined distance.

At S506, the processor/CPU 210 determines whether a permission signal to logoff the personal account is received from the second computer device 30 or not. Then if the processor/CPU 210 determines the permission signal is received, the step proceeds to S416 and the processor/CPU 210 controls the transmitter/receiver 218 to transmit a logoff request from the personal account to the server 50. If the processor/CPU 210 determines the permission signal is not received, the step proceeds to S508.

At S508, the processor/CPU 210 determines whether the distance between the first computer device 20 and the second computer device 30 is greater than a second predetermined distance (e.g., 2 mile) which is greater than the first predetermined distance, or not. Like the first predetermined distance, the second predetermined distance may be preregistered to the memory 212 of the first computer device 20, or it may be preregistered to the server 50 through the website of the personal account by the user and received from the server by the transmitter/receiver 218. Then if the processor/CPU 210 determines the distance is greater than the second predetermined device, the step proceeds to S510. If the processor/CPU 210 determines the distance is not greater than the second predetermined device, the step proceeds to S506. In another example, the S508 may be conducted only for the specific accounts a user preregistered beforehand on the website, or only when the processor/CPU 210 determines the encryption/security level of the website is higher than a second specific level which is higher than the first specific level described in the S408 in FIG. 4.

In another example, the processor/CPU 210 determines whether a period of time, during which the distance between the first computer device 20 and the second computer device 30 is greater than the first predetermined distance, exceeds a predetermined amount of time (e.g., 3 minutes). The predetermined amount of time may be preregistered to the memory 212 of the first computer device 20, or it may be preregistered to the server 50 through the website of the personal account by the user and received from the server by the transmitter/receiver 218. Then if the processor/CPU 210 determines the period of time exceeds the predetermined amount of time, the step proceeds to S510. If the processor/CPU 210 determines the period of time does not exceed the predetermined amount of time, the step proceeds to S506.

Figure 6:
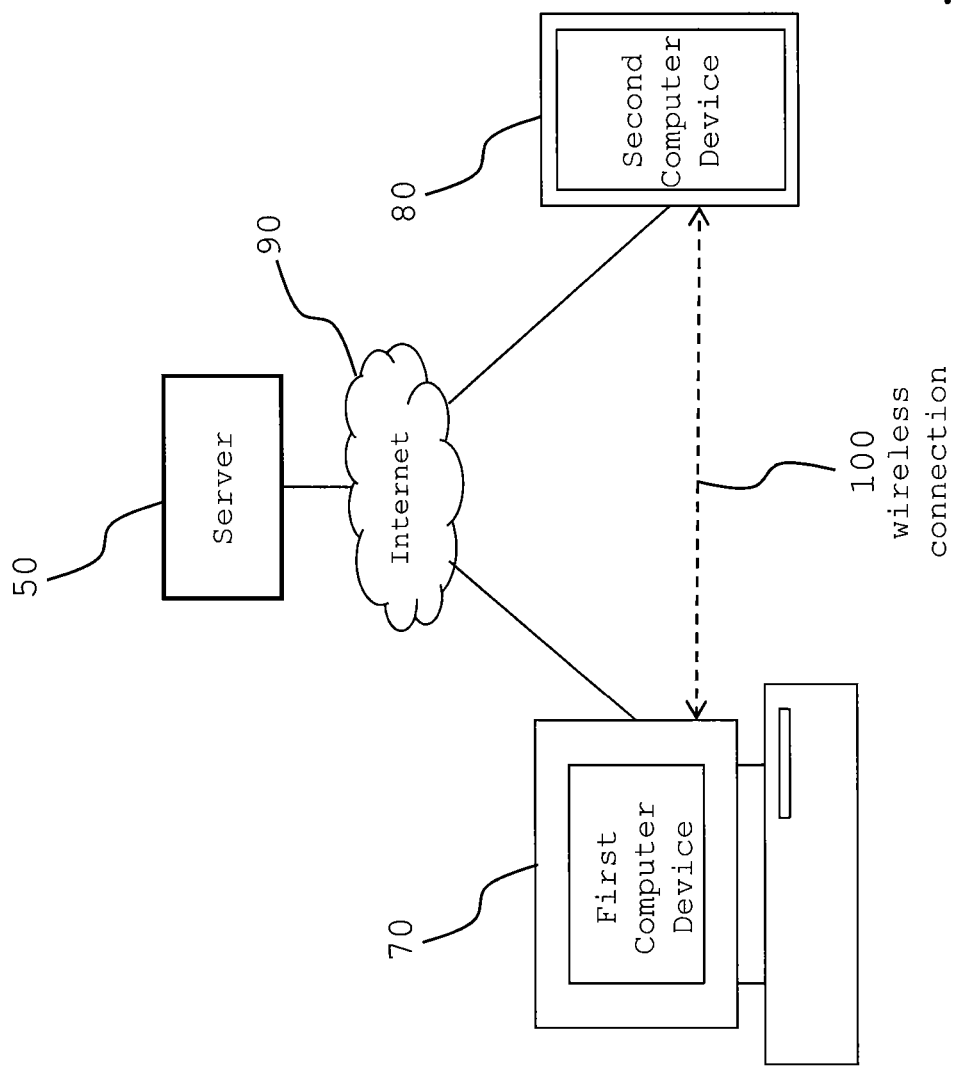
FIG. 6 is an exemplary system for controlling a login status of a computer device to a personal account located on a server according to another embodiment.

FIG. 6 is an exemplary system for controlling a login status of a computer device to a personal account located on a server according to another embodiment. In this embodiment, the first computer device 70 and the second computer device 80 can transmit information with each other through a wireless connection 100 (e.g., wireless sensor networks (e.g., Bluetooth), or short range point-to-point communication (e.g., Near Field Communication)). Therefore, in this embodiment, for example, the first computer device 70 may communicate with the second computer device 80 through the wireless connection 100, and the first computer device 70 may also determine the distance from the second computer device 80 by measuring the strength of the wireless connection 100.

Figure 7:
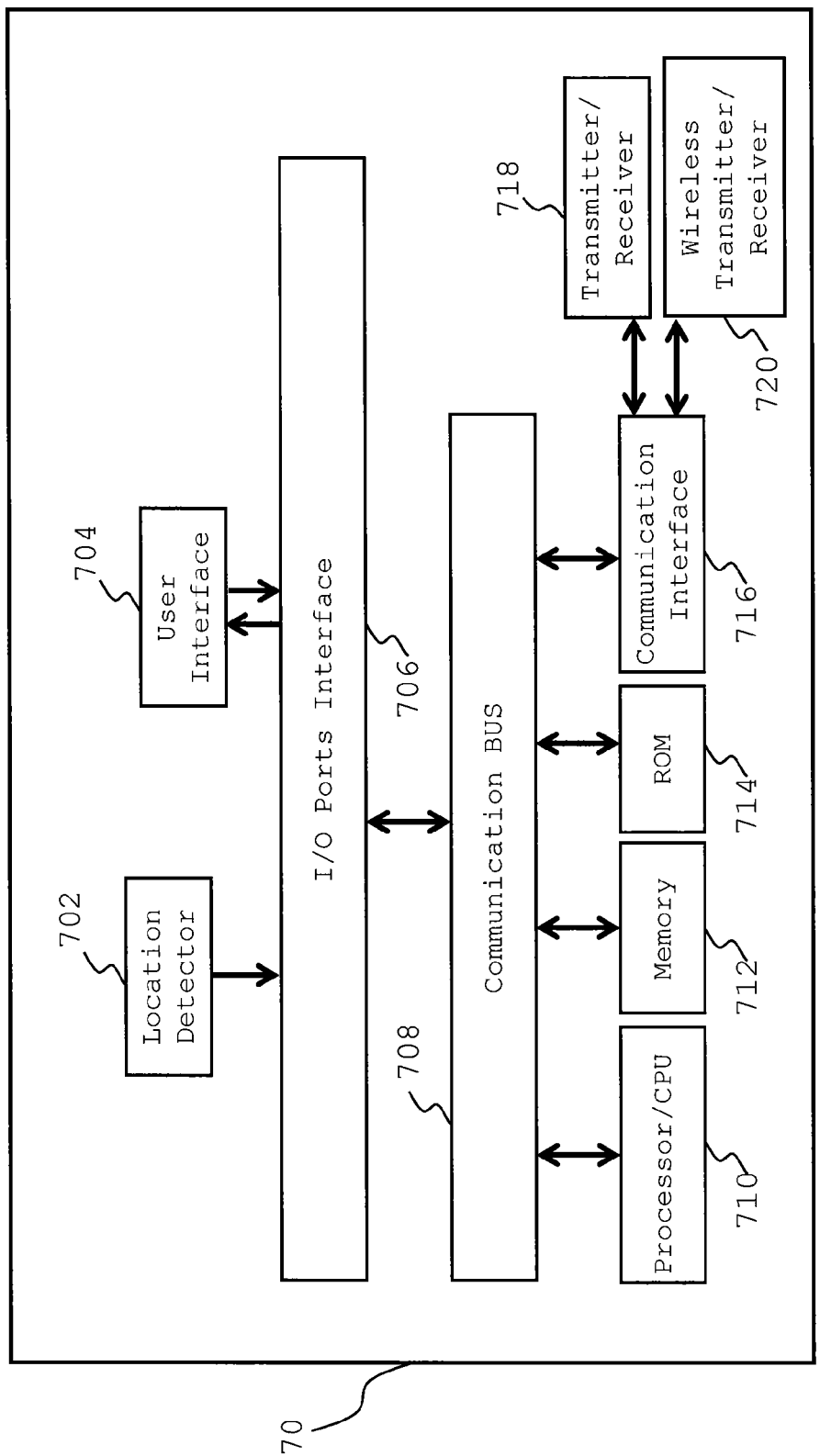
FIG. 7 is an exemplary block diagram of a first computer device according to another embodiment.

FIG. 7 is an exemplary block diagram of the first computer device according to another embodiment. In this embodiment, in addition to the components described in FIG. 2, a wireless transmitter/receiver 720 is provided to the first computer device 70. Many of the components perform a similar function to those described in FIG. 2. Through the wireless transmitter/receiver 720, the first computer device 70 establishes the wireless connection 100 with the second computer device 80.

Figure 8:
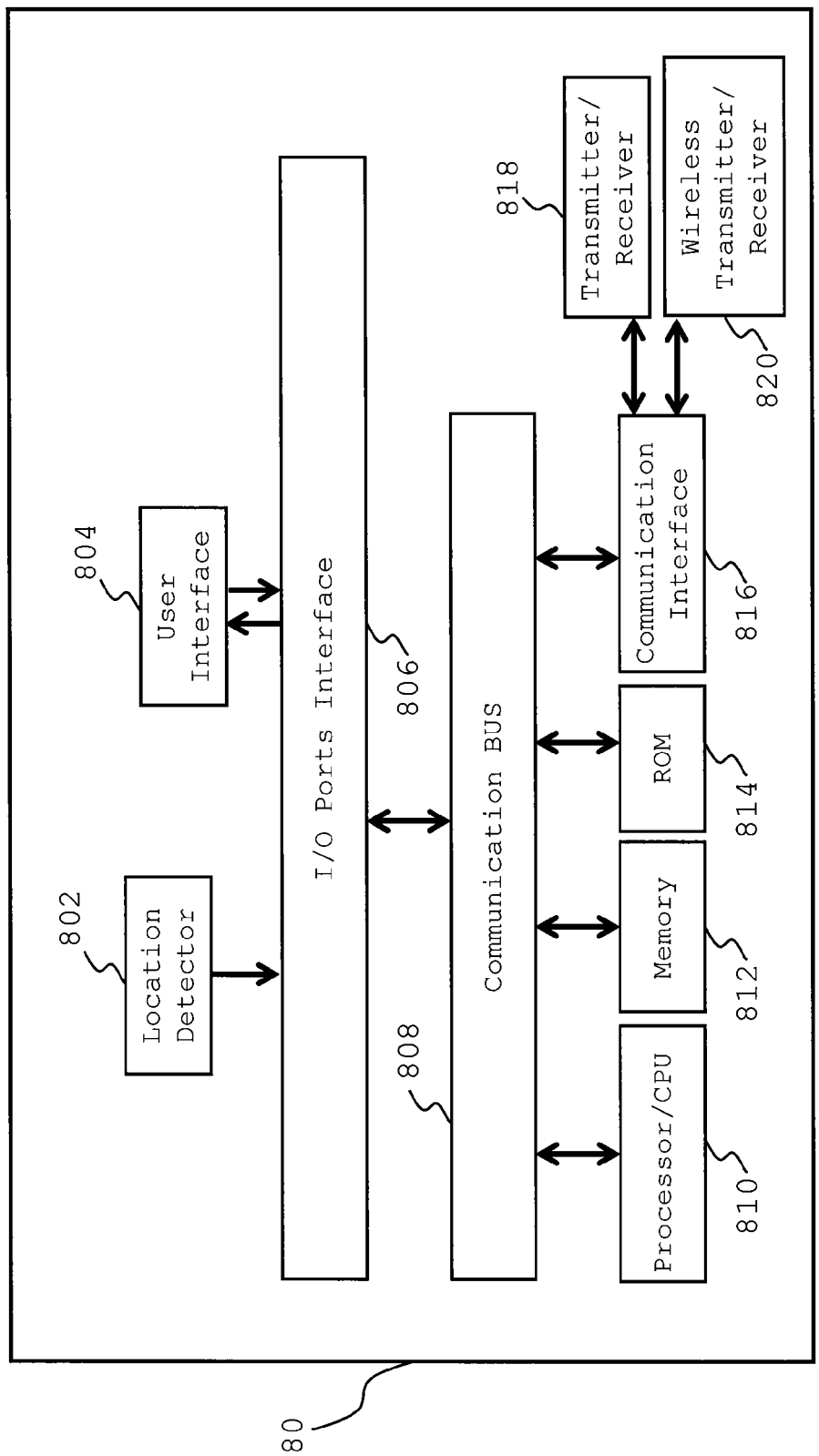
FIG. 8 is an exemplary block diagram of a second computer device according to another embodiment.

FIG. 8 is an exemplary block diagram of the second computer device according to another embodiment. In this embodiment, in addition to the components described in FIG. 3, a wireless transmitter/receiver 820 is provided to the second computer device 80. Many of the components perform a similar function to those described in FIG. 3. Through the wireless transmitter/receiver 820, the second computer device 80 establishes the wireless connection 100 with the first computer device 70.

Figure 9:
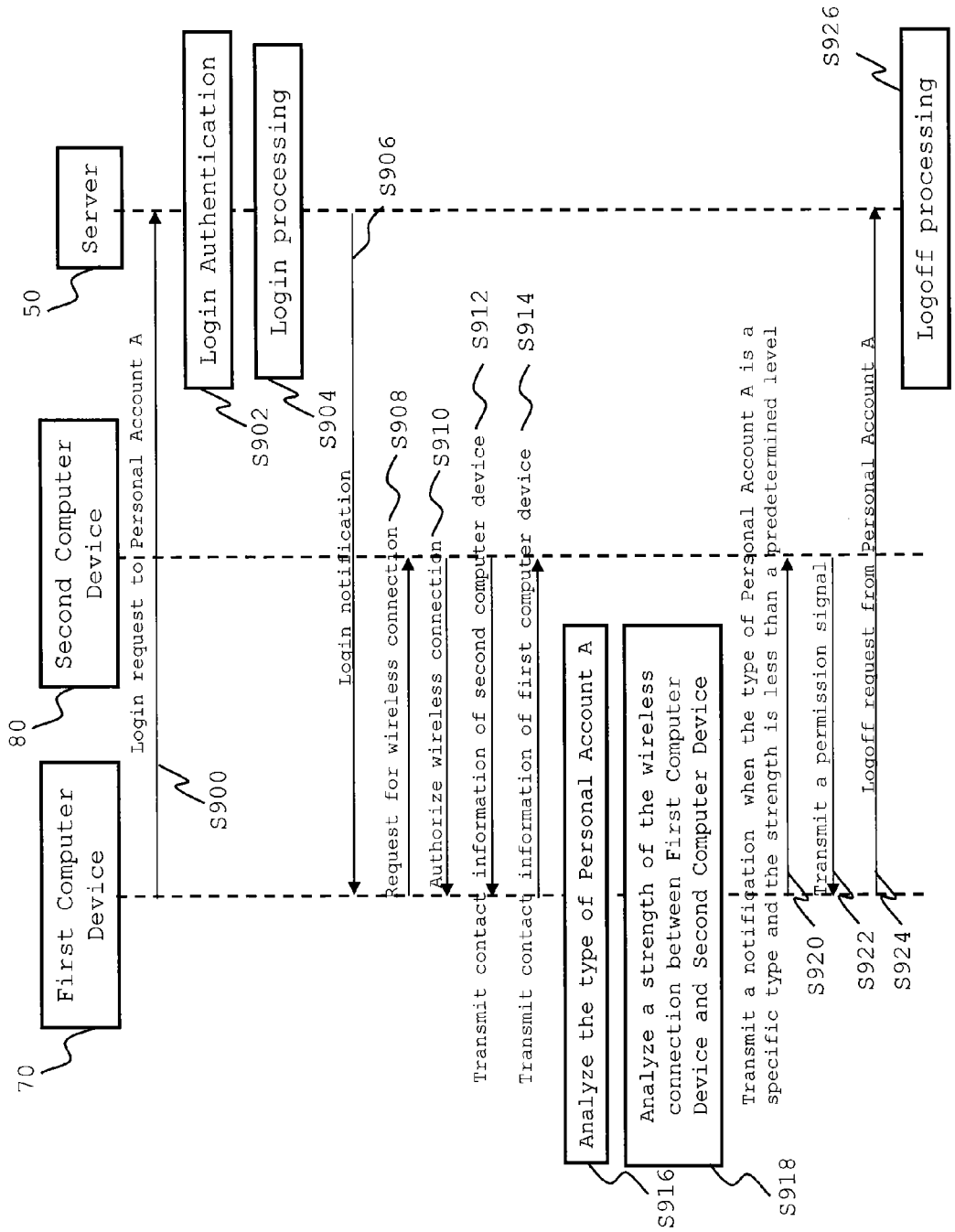
FIG. 9 is an exemplary flowchart of a system for controlling a login status of a computer device to a personal account located on a server according to another embodiment.

FIG. 9 is an exemplary flowchart of a system for controlling a login status of a computer device to a personal account located on a server according to another embodiment. In this embodiment, after the server 50 performs login processing and allows the first computer device 70 to login to the personal account A at S904, the server 50 transmits a login notification to the first computer device 70 at S906. Then at S908, in response to the login notification, the first computer device 70 transmits a request for wireless connection to the second computer device. This request may be sent based on the input from the user interface 704 (e.g., selecting the name of the wireless device to establish wireless connection around the first computer device 70, which are automatically displayed on the display according to the detection of wireless signal by the wireless receiver 720) or sent automatically in response to the login notification. When the second computer 80 receives the request for wireless connection, for example, the processor/CPU 810 may control the user interface 804 to display a message that a request for wireless connection was transmitted from the first computer device 70 and display an inquiry whether to authorize the first computer device 70 to establish wireless connection with the second computer device 80 or not. Then if an input to authorize the wireless connection is inputted from the user interface 804, at S910, the second computer device 80 transmits a signal to authorize wireless connection to the first computer device 70, and the wireless transmitter/receiver 820 establishes wireless connection with the wireless transmitter/receiver 720. Then, at S912 the second computer device 80 transmits contact information of the second computer device 80 to the first computer device 70, and at S914 the first computer device 70 transmits contact information of the first computer device 70 to the second computer device 80, so that the first computer device 70 and the second computer device 80 may communicate with each other at S920 and S922 after the strength of the wireless connection becomes less than a predetermined level.

The order of S912 and S914 may be opposite. The contact information may be such as an email address, network address, or a phone number.

At S918, the processor/CPU 710 in the first computer device 70 analyzes a strength of the wireless connection between the first computer device 70 and the second computer device 80. Detailed description on S918 is described in FIG. 10. Then at S920, the processor/CPU 710 in the first computer device 70 controls the transmitter/receiver 718 or wireless transmitter/receiver 720 to transmit a notification to the second computer device 80 when the type of the personal account A is the specific type and the strength of the wireless communication between the first computer device 70 and the second computer device 80 becomes less than a predetermined level. Other steps perform a similar function to those described in FIG. 4.

Figure 10:
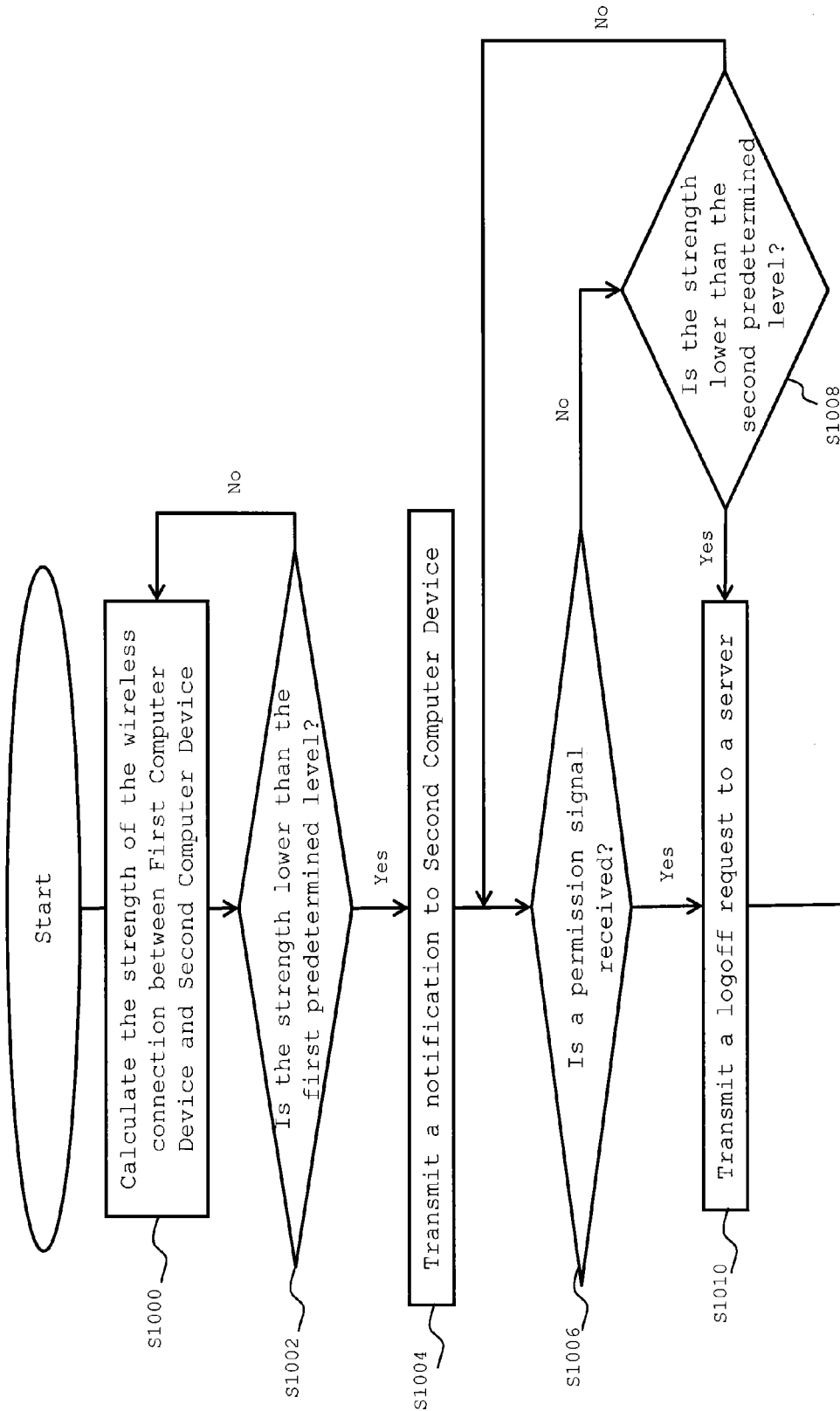
FIG. 10 is an exemplary flowchart of an analysis on distance between a first computer device and a second computer device according to another embodiment.

FIG. 10 is an exemplary flowchart of an analysis on distance between the first computer device 70 and the second computer device 80 according to another embodiment. At S1000, the processor/CPU 710 in the first computer device 70 calculates the strength of the wireless connection between the first computer device 70 and the second computer device 80. For example, the strength may be calculated by monitoring a transmission speed (e.g., bit/second), or it may be calculated as a radio field intensity (e.g., dBm) or any other measurement between two wireless devices as would be understood by one of ordinary skill in the art.

At S1002, the processor/CPU 710 determines whether the strength is lower than the first predetermined level or not. The first predetermine level may be preregistered to the memory 712 of the first computer device 70, or it may be preregistered to the server 50 through the website of the personal account A by the user and received from the server by the transmitter/receiver 718. The user may preregister the first predetermined level for each of the personal account by preregistering the level to each of the personal account. Then if the processor/CPU 210 determines the level is not lower than the first predetermined level, the step proceeds to S1000 and the processor/CPU 710 keeps on calculating the strength until the strength becomes lower than the first predetermined level. If the processor/CPU 710 determines the strength is lower than the first predetermined level, the step proceeds to S1004.

At S1004, the processor/CPU 710 controls the transmitter/receiver 718 or wireless transmitter/receiver 720 to transmit a notification to the second computer device 80 when the type of the personal account A is the specific type and the strength becomes lower than the first predetermined level.

At S1006, the processor/CPU 710 determines whether a permission signal to logoff the personal account is received from the second computer device 80 or not. Then if the processor/CPU 710 determines the permission signal is received, the step proceeds to S1010 and the processor/CPU 710 controls the transmitter/receiver 718 to transmit a logoff request from the personal account to the server 50. If the processor/CPU 710 determines the permission signal is not received, the step proceeds to S1008.

At S1008, the processor/CPU 710 determines whether the strength is lower than a second predetermined distance which is lower than the first predetermined level, or not. Like the first predetermined level, the second predetermined level may be preregistered to the memory 712 of the first computer device 70, or it may be preregistered to the server 50 through the website of the personal account by the user and received from the server by the transmitter/receiver 718. Then if the processor/CPU 710 determines the strength is lower than the second predetermined level, the step proceeds to S1010. If the processor/CPU 710 determines the strength is not lower than the second predetermined level, the step proceeds to S1006. In another example, the S1008 may be conducted only for the specific accounts a user preregistered beforehand on the website, or only when the processor/CPU 710 determines the encryption/security level of the website is higher than a second specific level which is higher than the first specific level described in the S916 in FIG. 9.

In another example, the processor/CPU 710 determines whether a period of time, during which the strength is lower than the first predetermined level, exceeds a predetermined amount of time (e.g., 3 minutes). The predetermined amount of time may be preregistered to the memory 712 of the first computer device 70, or it may be preregistered to the server 50 through the website of the personal account by the user and received from the server by the transmitter/receiver 718. Then if the processor/CPU 710 determines the period of time exceeds the predetermined amount of time, the step proceeds to S1010. If the processor/CPU 710 determines the period of time does not exceed the predetermined amount of time, the step proceeds to S1006.

Figure 11:
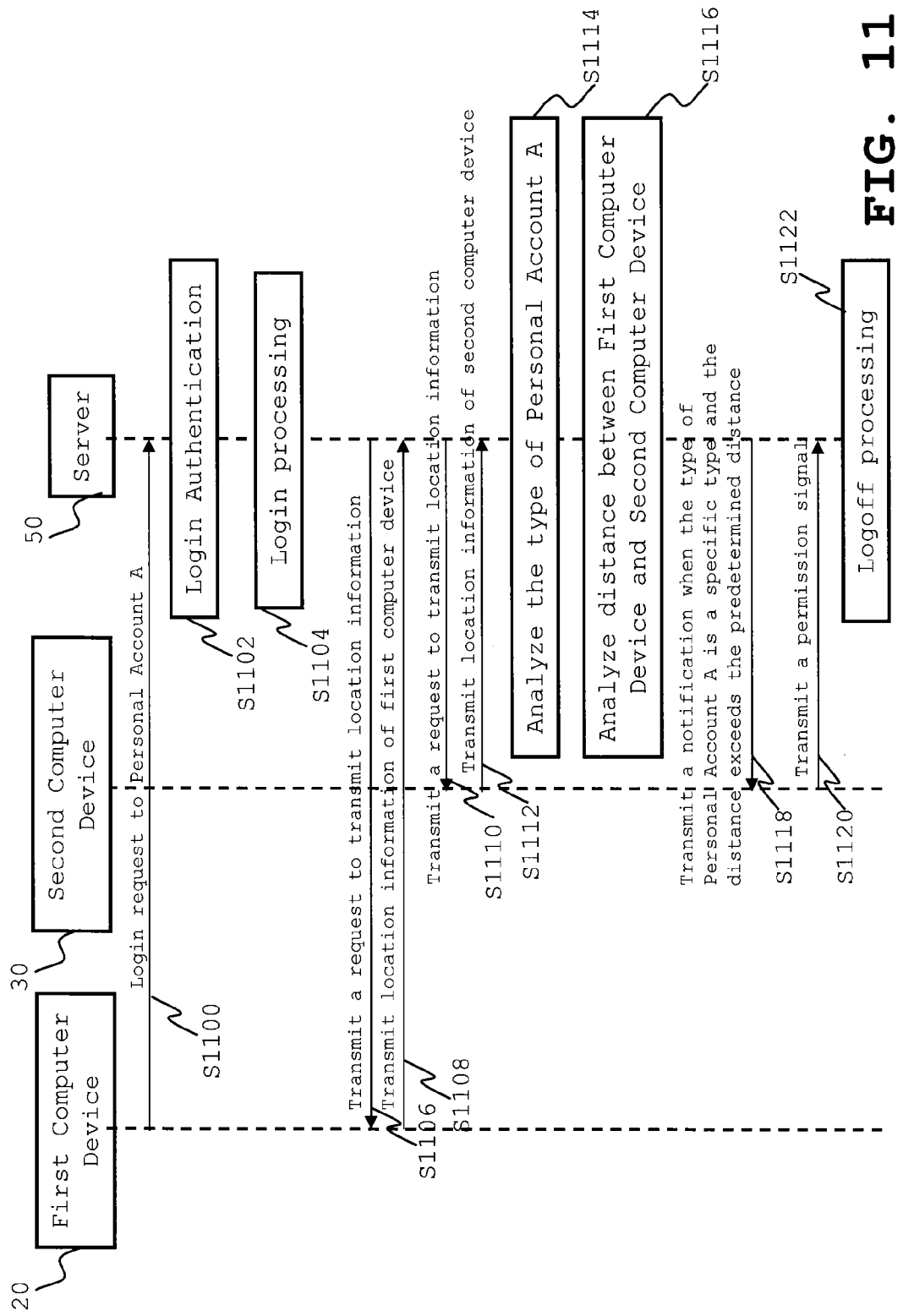
FIG. 11 is an exemplary flowchart of a system for controlling a login status of a computer device to a personal account located on a server according to another embodiment.

FIG. 11 is an exemplary flowchart of a system for controlling a login status of a computer device to a personal account located on a server according to another embodiment. In this embodiment, instead of the first computer device 20, the server 50, or another computer device in the server 50 comprising the same kind of components as the first computer device 20 (e.g., processor/CPU, memory, ROM, communication interface, transmitter/receiver, communication bus, I/O Ports Interface, use interface), analyzes the type of personal account and distance between the first computer device 20 and the second computer device 30 based on location information of the first computer device 20 and the second computer device 30. In this embodiment, after the server 50 performs login processing and allows the first computer device 70 to login to the personal account A at S1104, the server 50 transmits a request to transmit location information to the first computer device 20 at S1106. Then at S1108, in response to the request, the first computer device 20 transmits location information of the first computer device 20 to the server 50. The first computer device may output from the user interface 204 (e.g., display) the inquiry whether the user allows the first computer device 20 to transmit the location information of the first computer device 20, and if the user allows the first computer device 20 to transmit the location information of the first computer device 20 by inputting from the user interface 204, the first computer device 20 may transmit the location information of the first computer device 20 to the server 50. The server 50 also transmits a request to transmit location information to the second computer device 30 at S1110. The server 50 may transmit this request based on contact information (e.g., email address, phone number) of the second computer device 30 preregistered to the Personal Account A, or based on the input from the first computer device 20. Then at S1112, in response to the request, the second computer device 30 transmits location information of the second computer device 30 to the server 50.

Then, at S1114, the server 50 analyzes the type of the personal account A and judges whether the personal account A is a type of a personal account to control the login status or not. For example, a user may preregister the personal account to control a login status by inputting whether or not the user wants a login status control on the website of personal account A. The server 500 analyzes whether the user preregistered the personal account as an account to control a login status. This analysis may be conducted just after S1104, and the server 500 may transmit a request to transmit location information to the first computer device 20/the second computer device 30 only when the server 500 judges the personal account A is a type of a personal account to control the login status. This analysis step S1114 may be conducted in various ways as described in S408 of FIG. 4.

At S1116 the server 500 analyzes distance between the first computer device 20 and the second computer device 30 based on the received location information.

At S1118, the server 50 transmits a notification to the second computer device 30 when the type of the personal account A is the specific type of account to control the login status (e.g., bank account, company intranet) and the distance between the first computer device 20 and the second computer device 30 exceeds the predetermined distance. This notification may include a text message, such as "May the first computer device 20 logoff the personal account A?" inquiring a permission to logoff the personal account A.

In response to the notification, if the user determines that the first computer should logoff the personal account A, for example, he may select "Yes" on the touch panel 304 of the second computer device 30, and then at S1120, the second computer device 30 transmits a permission signal to logoff the personal account A to the server 50.

At S1122, when the server 50 receives the permission signal from the second computer device 30, the server 50 performs logoff processing. Other steps perform a similar function to those described in FIG. 4.

Figure 12:
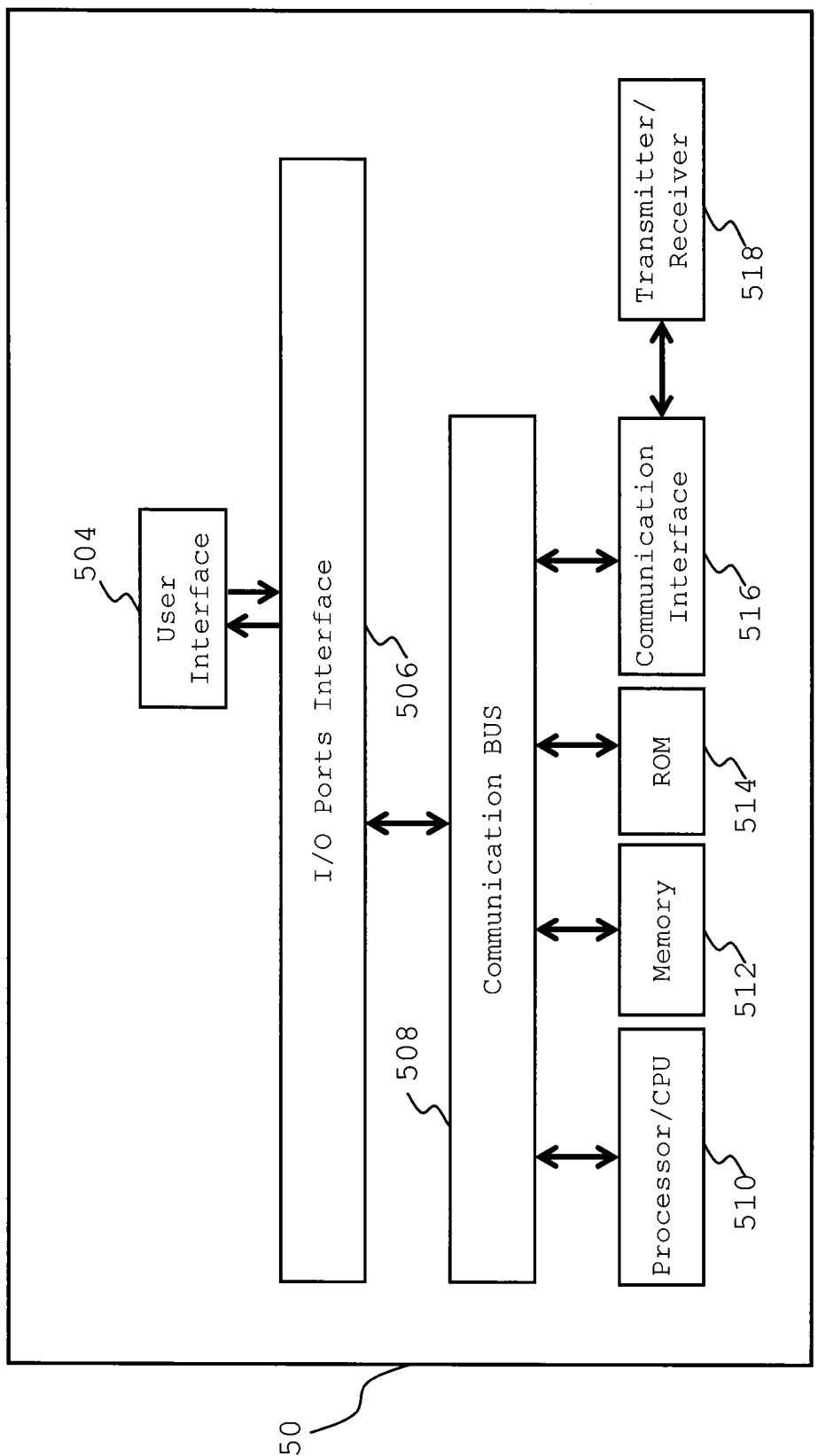
FIG. 12 is an exemplary block diagram of a server according to one embodiment.

FIG. 12 is an exemplary block diagram of the server 50 according to one embodiment. Many of the components perform a similar function to those described in FIG. 2.

Any processes, descriptions or blocks in flow charts should be understood as representing modules, segments, portions of code which include one or more executable instructions for implementing specific logical functions or steps in the process, and alternate implementations are included within the scope of the exemplary embodiment of the present system in which functions may be executed out of order from that shown or discussed, including substantially concurrently or in reverse order, depending upon the functionality involved, as would be understood by those skilled in the art. Further, it is understood that any of these processes may be implemented as computer-readable instructions stored on computer-readable media for execution by a processor.

Obviously, numerous modifications and variations of the present system are possible in light of the above teachings. It is therefore to be understood that within the scope of the appended claims, the system may be practiced otherwise than as specifically described herein.

The invention claimed is:

1. A computer device that can login to a personal account located on a server via a network, the computer device comprising:
   communication circuitry configured to access the network;
   a user interface to receive a request to login to the personal account;
   a memory that stores information received by the communication circuitry and the user interface; and processing circuitry configured to:
   control the communication circuitry to transmit to the server a request to login to the personal account; analyze a type of the personal account;
   calculate a distance between the computer device and another computer device designated by information received from the server;
   control the communication circuitry to transmit a notification to the another computer device in response to the processing circuitry determining that the type of personal account is a specific personal account by analyzing whether security level of a website on the server relating to the personal account is higher than a first specific level and the distance being greater than a first predetermined distance;

control the communication circuitry to transmit a request to the server to logoff the personal account when a permission signal to logoff the personal account is received from the another computer device by the communication circuitry in response to the notification; and control the communication circuitry to automatically transmit a request to logoff the personal account to the server without receiving the permission signal from the another computer device when the processing circuitry determines the security level of the website is higher than a second specific level which is higher than the first specific level and the distance between the computer device and the another computer device exceeds a second predetermined distance which is greater than the first predetermined distance.

2. The computer device according to claim 1, wherein the computer device automatically transmits a request to logoff the personal account to the server without receiving the permission signal from the another computer device when a period of time, during which the distance between the computer device and the another computer exceeds the first predetermined distance, exceeds a predetermined amount of time.

3. The computer device according to claim 1, wherein the information on the first specific level, the first predetermined distance and the second predetermined distance is received from the server by the communication circuitry.

4. The computer device according to claim 1, wherein
the communication circuitry establishes a wireless connection with the another computer device, and
the processing circuitry determines the distance is greater than the first predetermined distance when a strength of the wireless connection with the another computer device becomes lower than a first predetermined level.

5. The computer device according to claim 4, wherein the communication circuitry automatically establishes a wireless connection with the another computer device when the computer device is logged in to the personal account of the server.

6. The computer device according to claim 1, further comprising:
a location detector that detects a location of the computer device,
wherein the processing circuitry calculates the distance between the computer device and the another computer device by using both the location information of the computer device detected by the location detector and GPS information transmitted from the another computer device, and
wherein the processing circuitry determines that the distance is greater than the first predetermined distance by comparing the distance calculated by the processing circuitry with the first predetermined distance.

7. The computer device according to claim 6, wherein the location detector detects the location of the computer device via GPS.

8. The computer device according to claim 6, wherein the location detector detects the location of the computer device as a network address on the network.

9. The computer device according to claim 7, wherein the processing circuitry controls the communication circuitry to transmit the notification to the another computer device in response to the location detector detecting that the computer device is not located at a predetermined location.

10. A method for controlling a login status of a computer device to a personal account located on a server, the method comprising the steps of:
accessing, via communication circuitry, a network from the computer device;
logging into a personal account located on a server via the network;
analyzing a type of the personal account;
calculating a distance between the computer device and another computer device designated by information received from the server;
determining, via processing circuitry, whether the type of the personal account which the computer device is logged in to is a specific personal account or not;
determining, via the processing circuitry, whether the another computer device is within a first predetermined distance from the computer device or not;
transmitting a notification to the another computer device, in response to determining that the personal account which the computer device is logged in to is the specific personal account by analyzing, via the processing circuitry, whether security level of a website on the server relating to the personal account is higher than a first specific level, and in response to determining that the another computer device is not within the first predetermined distance from the computer device;
transmitting a request to logoff the personal account to the server when a permission signal to logoff the personal account is received from the another computer device in response to the notification; and
transmitting a request to logoff the personal account to the server without receiving the permission signal from the another computer device when the processing circuitry determines the security level of the website is higher than a second specific level which is higher than the first specific level and the distance between the computer device and the another computer device exceeds a second predetermined distance which is greater than the first predetermined distance.

11. A server that manages a personal account on a network, the server comprising:
communication circuitry configured to receive a request to login to the personal account from a first computer device via the network;
a memory that stores contact information of a second computer device; and
processing circuitry configured to:
conduct an authentication of the request to login to the personal account from the first computer device;
control the first computer device to login to the personal account if the request is authenticated;
control the communication circuitry to transmit to the first computer device a request to transmit location information of the first computer device;
control the communication circuitry to transmit to the second computer device based on the contact information a request to transmit location information of the second computer device;
analyze a type of the personal account;
calculate a distance between the first computer device and the second computer device based on location information of the first computer device received from the first computer device by the communication circuitry, and location information of the second computer device received from the second computer device by the communication circuitry;

control the communication circuitry to transmit a notification to the second computer device in response to the processing circuitry determining that the type of personal account is a specific personal account by analyzing whether security level of a website on the server relating to the personal account is higher than a first specific level and the distance being greater than a first predetermined distance;

control the first computer device to logoff the personal account when a permission signal to logoff the personal account is received from the second computer device by the communication circuitry in response to the notification; and control the first computer to logoff the personal account without receiving the permission signal from the second computer device when the processing circuitry determines the security level of the website is higher than a second specific level which is higher than the first specific level and the distance between the first computer device and the second computer device exceeds a second predetermined distance which is greater than the first predetermined distance.

* * * * *